Patented Nov. 11, 1930

1,781,249

UNITED STATES PATENT OFFICE

WILLARD J. SCHOLL, OF JACKSON, MICHIGAN, ASSIGNOR TO MALT-O-MATIC CORPORATION, A CORPORATION OF MICHIGAN

FOOD BEVERAGE AND METHOD FOR PREPARING THE SAME

No Drawing.    Application filed October 21, 1929.  Serial No. 401,373.

My present invention relates primarily to chilled food beverages and to methods for preparing the same, and is more especially concerned with non-effervescent drinks of the type commonly dispensed at soda fountains, and that include in solution or suspension solid ingredients of more or less concentrated nutritive value, such as butter fat, serum solids, malt, cocoa, albumen, or an admixture of two or more of such ingredients, and which generally include sugar, flavoring matter, gelatin and other ingredients commonly used in soft drinks.

As conducive to a clear understanding of the invention, it is noted that the usual preparation at a soda fountain of a chilled food beverage, such as a malted milk drink, for instance, involves the commingling of milk ice cream, flavoring syrup, malted milk, etc., by mechanical scrambling thereof in an electric drink mixer. In the mixing action, the ice cream is broken up into small particles and these in turn are partly or wholly melted by exposure to room temperature during mixing, by the heat generated due to friction in the operation of the mixer, and by contact with the relatively warmer milk and syrup that are poured into the mixer usually at about 40 degrees F.

The resultant drink even when prepared by a skilled attendant, is not particularly palatable to the great majority of persons, because it is relatively flat, heavy and not sufficiently cold. In general, it is far from homogeneous, and frequently has palpable particles of ice cream still floating therein with malted milk powder adhering thereto. Moreover, it usually takes from three to five minutes to prepare the drink even though only twenty per cent of ice cream be included, a decided handicap to efficient turn-over at the soda fountain, and a tax on the patience of patrons who order such beverage when they have insufficient time to partake of a regular meal.

An object of the present invention is to secure enhanced palatability by affording, at low temperature, well below that of the freezing point of water, a beverage which is unstratified, uniform and devoid of sediment, of smooth, rich, creamy consistency and of light weight.

Another object is to provide a method for preparing a beverage of the above type, by which the same ingredients commonly used in drinks of this type, may be so proportioned as to afford enhanced nutritive value at reduced cost.

Another object is to provide a method which admits of preparing a beverage of the above type long before use and maintaining it in proper condition, so that it can be served without delay when required, and more particularly a method which admits of the preparation of the beverage in mass production at a central plant, by the use of conventional machinery commonly used in the manufacture of ice cream.

The beverage of the present invention is not effervescent and yet includes in suspension in the potable liquid base thereof, a high proportion by volume of air or other gas, so intimately combined, however, with the liquid and solid ingredients and in bubbles so minute that the beverage is a thick, creamy liquid, apparently homogeneous to the eye and homogeneous to the feel during drinking thereof.

The beverage also includes minute impalpable crystals of water ice, apparently sustained by the surface tension of the liquid films that confine the individual minute bubbles of entrapped air. The ice crystals thus remain distributed throughout the volume of the beverage, they do not float to the top and they aid in confining the air bubbles within the beverage.

The sugar content is in solution in the water base of the beverage and various other ingredients are either in suspension or in solution therein, and thus the freezing point is depressed, so that the beverage remains liquid at the preferred serving temperature of 24 to 27 degrees F.

In a preferred embodiment, fully one half of the volume of the beverage is air, which imparts the light creamy consistency noted, and spreads the liquid to encircle the individual air bubles, thereby to afford distributed surface tension sufficient to confine the air and to enmesh the ice crystals, which latter constitute preferably about 20 per cent by weight of the beverage, the specific gravity of which is thus about half that of water.

For more complete understanding of the invention, a popular embodiment thereof, in the form of a chocolate malted milk drink, will now be described.

Roughly, a desirable formula for this drink includes approximately 6 per cent of butter fat, 7.5 per cent of serum solids, 20 per cent of sugar, 2 per cent of malted milk, 1½ per cent of cocoa, and smaller quantities of gelatin, glucose and salt and the balance water. The proportions suggested while desirable, are by no means critical, and a satisfactory beverage results though these proportions be widely varied. For instance, the butter fat may be from 4 to 7 per cent, the serum solids from 6 to 10 per cent, the sugar from 15 to 25 per cent, the malted milk from 1½ to 2½ per cent and the cocoa from 1 to 2 per cent.

The invention embraces within the scope thereof, the beverage above described, regardless by which of various possible methods, it is prepared.

While the ultimate ingredients as above enumerated, may be employed, it is frequently preferred, in practice, to add these ingredients in the form of milk, ice cream mix, flavoring syrup, powdered malted milk, etc. as will now be described in connection with one preferred process for preparing the beverage.

A preferred mix for twenty gallons of the beverage includes the following ingredients: 5 gallons of ice cream mix as commonly used in ice cream factories, 2¾ gallons of milk, 2¼ gallons of chocolate-malt syrup. This is aerated with an equal volume of air to make 20 gallons of the beverage.

The ice cream mix ingredient may be of any standard formula, for example, one containing 10 per cent butter fat, 11 to 12 per cent serum solids, 14 to 16 per cent sugar, ¼ to ½ per cent gelatin, suitable flavoring and the balance water.

The chocolate-malt syrup ingredient may be of any desired formula, including chocolate-malt syrup, corn syrup, preferably the brand known as Karo, a concentrated sugar water syrup, and salt, combined in approximately the proportion of 30 pounds of chocolate-malt syrup (comprising 2 pounds of cocoa, 10 to 14 pounds of sugar, 3 pounds of malted milk powder and the rest water) 10 pounds corn syrup, ½ gallon concentrated sugar and water syrup and 1 ounce salt.

The mix, as above described, is preferably first passed under high pressure through the minute crevice of a homogenizer, by which thorough emulsification and stabilization of the mixture is brought about.

For the next step, a batch rotary freezer, or a continuous conveyor freezer is employed, both of type widely used to perform the first step of ice cream freezing, preparatory to finishing congelation in the hardening room of the ice cream plant.

In the preparation of my beverage, the batch or continuous freezer operates first to chill the mix therein, and to beat in air during the continued chilling. After the temperature of the mix reaches the freezing point of water, latent heat of fusion is abstracted from the mix in the continued refrigeration and crystals of water ice freeze out of the mix, but are kept from growing by the continued agitation of the freezer. The residual solution or suspension becomes more highly concentrated as water is frozen out and may be nearly or quite saturated with dissolved or suspended matter by the time the operation is completed. The freezing point of the concentrated residual solution or suspension is thereby substantially depressed, so that the beverage remains liquid at temperatures well below the freezing point of water. After about 15 minutes of batch freezer operation or a shorter period of continuous conveyor freezer operation, the solution will under ordinary conditions have reached a temperature of around twenty-seven degrees F., about 20 per cent by weight of the mix will have frozen out as minute ice crystals and 100 per cent by volume of air will have been beaten in and the beverage will be substantially ready for consumption.

The beverage may be stored in suitable containers, such as 5 gallon ice cream cans, in which it is conveyed to the soda dispensing or other place of consumption. A suitable quantity of the beverage is preferably kept ready for immediate service at the soda fountain in a special bulk dispensing container of capacity of one gallon or more, to be replenished from time to time from the ice cream can or other large supply container. The dispensing container is preferably thermostatically controlled, to maintain its contents at a temperature between 22 and 26 degrees F., and from it the prepared beverage is dispensed into drinking glasses or individual containers, as required.

Upon completion at the central plant, the beverage may be stored, if desired, in the hardening room preparatory to shipment, but it is preferred to maintain the beverage throughout, from the time of original preparation, to ultimate consumption thereof, at a temperature not much under 24 degrees F., nor much over 27 degrees F.

It is seen that my beverage may include ice cream mix to the extent of 50 per cent or more of its weight, that is, two or three times the ice cream content of the usual conventional malted milk drink, and yet the cost of my beverage is less per unit of volume. The saving is accounted for by the substantial overrun that adds to the smoothness, creaminess and palatability of the lightened product, and by the reduction in manufacturing cost due to omission of the step of completing or hardening the ice cream used and the substantial economy of time heretofore required for comminuting and melting the hardened ice cream into the drink. Not the least element of economy is the expedition of service at the dispensing fountain by eliminating the enforced wait of the patron pending the scrambling of the ice cream.

While the ingredients above indicated and the designated proportions thereof are recommended, as are also the indicated temperature of preparation and storage, reasonable latitude of variation is permissible within the scope of the appended claims, and in the broadest aspects of the invention, the beverage need not be chilled, but may be served hot, or at any desired temperature.

As many changes could be made in the beverage above described and in the method for preparing the same, and many apparently widely different embodiments could be made without departing from the scope of the invention, it is intended that all matter contained in the above description shall be interpreted as illustrative and not in a limiting sense.

In the specification and claims, the word "impalpable" is to be taken in its meaning of extreme fineness and not in its meaning of imperceptible to the senses.

Having thus described my invention, what I claim as new and desire to secure by Letters-Patent of the United States is:—

1. A chilled lactic beverage of temperature well below the freezing point of water and having uniform creamy consistency, specific gravity in the order of one-half that of water and including minute bubbles of air and minute impalpable crystals of ice, distributed throughout the volume of the product.

2. A chilled food beverage including milk products, sugar and other nutritive elements and having a uniform, creamy consistency of specific gravity in the order of one-half that of water and including minute impalpable crystals of ice pervading the entire volume thereof, the liquid ingredient carrying minute particles of food in solution or suspension, by which the freezing point of said liquid is depressed substantially below that of water and is maintained in fluid condition, at a temperature as low as twenty-five degrees F.

3. A chilled lactic food beverage of uniform, creamy consistency having a specific gravity in the order of one-half that of water, said beverage including minute distributing bubbles of air, minute impalpable crystals of ice and solid food particles dissolved or suspended in the liquid and depressing the freezing point thereof, to remain in fluid condition at twenty-five degrees Fahrenheit, the chilled liquid with its suspended particles and ice crystals having sufficient viscosity at said temperature to remain in static equilibrium, with the air entrapped therein.

4. A chilled malted milk beverage including approximately 6 per cent of butter fat, 7.5 per cent of serum solids, 20 per cent of sugar, 2 per cent of malted milk and 1½ per cent of cocoa, said ingredients in nearly saturated solution or suspension in a base of water, said beverage having minute water ice crystals distributed therein, approximating 20 per cent of the weight thereof, said beverage including approximately 50 per cent by volume of air distributed therein, in minute bubbles, and confined by the surface tension of the liquid solution or suspension, with its enmeshed ice crystals, said beverage remaining in stable equilibrium at a temperature below the freezing point of water.

5. The method of preparing a chilled lactic food beverage which consists in forming a liquid mix with various food ingredients in solution or suspension therein, and applying refrigeration to form minute ice crystals therein, while simultaneously agitating the mix to maintain the ice crystals of minute size and distributed throughout the mix and incorporating air into the mix during the ice forming operation.

6. The method of preparing a chilled lactic food beverage from a liquid mix having a water base and various solid ingredients in solution or suspension therein, which includes the step of refrigerating and simultaneously agitating the mix to maintain the ice crystals thus formed small, impalpable and well distributed and continuing said refrigeration until the solution or suspension becomes nearly saturated, while beating in air during the process of agitation until the final volume is approximately double that of the original mix.

7. The method of preparing a chilled lactic food beverage from a liquid mix having a water base and various solid ingredients in solution and suspension therein, which includes the step of refrigerating and simultaneously agitating the mix to maintain the ice crystals thus formed small, impalpable and well distributed, and continuing said refrigeration until the solution or suspension becomes nearly saturated, while beating in air during the process of agitation until the final volume is approximately double that of the original mixture, and maintaining said product at a temperature below 30° Fahrenheit until consumption thereof.

Signed at Jackson, in the county of Jackson and State of Michigan, this 19th day of October, A. D. 1929.

WILLARD J. SCHOLL.